United States Patent [19]
Sali et al.

[11] Patent Number: 5,354,541
[45] Date of Patent: Oct. 11, 1994

[54] OZONE GENERATOR

[76] Inventors: Louis Sali, 4709 Orange River Loop Rd., Fort Myers, Fla. 33905; Anthony P. LeBoutillier, 2031 Mission Valley Blvd., Nokomis, Fla. 34275

[21] Appl. No.: 74,212

[22] Filed: Jun. 9, 1993

[51] Int. Cl.⁵ .................. C01B 13/11; B01J 19/12
[52] U.S. Cl. ................ 422/186.07; 422/186.11; 422/186.18; 422/186.19; 422/186.2
[58] Field of Search ............ 422/186.07, 186.11, 422/186.18, 186.19, 186.2

[56] References Cited

U.S. PATENT DOCUMENTS

| | | |
|---|---|---|
| 1,011,503 | 12/1911 | Shepherd . |
| 3,421,999 | 1/1969 | Corwin ........................ 204/314 |
| 3,677,931 | 7/1972 | O'Hare ........................ 204/312 |
| 4,049,552 | 9/1977 | Arff ............................. 210/192 |
| 4,090,960 | 5/1978 | Cooper ........................ 210/63 |
| 4,176,061 | 11/1979 | Stopka ........................ 210/63 |
| 4,427,426 | 1/1984 | Johnson et al. ............... 52/162 |
| 4,737,885 | 4/1988 | Akutsu ........................ 361/225 |
| 4,834,948 | 5/1989 | Schmiga et al. ............. 422/186.19 |
| 4,960,570 | 10/1990 | Mechtersheimer .......... 422/186.21 |
| 5,008,087 | 4/1991 | Batchelor ................... 422/186.22 |
| 5,009,858 | 4/1991 | Mechtersheimer .......... 422/186.19 |
| 5,147,614 | 9/1992 | Conrad ...................... 422/186.18 |
| 5,169,606 | 12/1992 | Batchelor ................... 422/186.19 |

Primary Examiner—Donald P. Walsh
Assistant Examiner—Daniel Jenkins
Attorney, Agent, or Firm—Warren L. Franz

[57] ABSTRACT

An ozone generator (10) has a helical spring anode (12) located within a sealed glass dielectric tube (14) and a metal tube cathode (15) spaced across an annular gap (16) from glass tube (14). The dielectric/electrode subassembly (12, 14, 15, 16) is contained within a hollow cylindrical housing (25) made up of a tubular sleeve (26) centered between left and right porting collars (27, 28) and left and right end caps (30, 31). Gas inlet and outlet fittings (43, 44) connected through collars (27, 28) to flow oxygen axially along gap (16) through a varying intensity corona discharge, having maximums at centers of coils and minimums between coils of spring (12), and frequency determined by flow speed and coil twin separation. Fluid inlet and outlet fittings (50, 51) connect through sleeve (26) to pass cooling fluid along an annular conduit (47) formed between the inside of sleeve (26) and the outside of cathode (15). In a modified implementation, a plurality of generators (10') are mounted in axially parallel positions with sleeves (26) omitted and cathodes (15) located within a common cooling jacket (80).

13 Claims, 2 Drawing Sheets

OZONE GENERATOR

This invention relates to ozone generators, in general; and, in particular, to an ozone generator having improved electrode and packaging configurations.

BACKGROUND OF THE INVENTION

It is common practice to purify water for industrial and domestic use by subjecting it to treatment with ozone gas. The same treatment can be applied for purifying gases and other liquids. Ozone is produced by passing oxygen or a mixture of gases containing oxygen, such as air, through a corona discharge established between pairs of electrodes which are separated by an air gap and a dielectric shield, when the electrodes are connected to a high voltage source. Glass is the most common dielectric material used in such generators.

A common type of ozone generator relies upon a corona discharge in the annular space between an inner metal rod and an outer metal tube, with a glass tube interposed between the outer tube and the rod. To avoid excessive heat buildup due to the corona, water or other cooling fluid is used to cool one of the electrodes and the other electrode is cooled by heat radiation to the environment.

An ozone generator acts as a high-potency ion source when it is caused to generate a high frequency corona discharge by applying a high-frequency voltage to an electrode. The electrochemical action is particularly productive when a high voltage with an extremely short pulse is applied to the ozonizer electrode. Examples of ozone generators of the type to which the present invention relates are given in U.S. Pat. Nos. 1,011,503; 3,421,999; 3,677,931; 4,049,552; 4,090,960; 4,176,061 and 4,427,426.

SUMMARY OF THE INVENTION

It is an object of the present invention to provide an ozone generator having an improved electrode configuration.

It is a further object of the invention to provide an ozone generator having an improved housing structure packaging configuration.

In accordance with the invention, an ozone generator comprises a helical spring electrode extending axially in contact with the inside wall of a dielectric in the form of a sealed glass tube. A second electrode in the form of a metal tube is spaced across an annular gap to circumferentially surround the glass tube, and the whole is contained within the interior of a cylindrical housing. Inlet and outlet ports function to flow dry air or oxygen through the annular gap, and spacing between the tubular electrode and the housing provides a conduit through which water or other coolant may be flowed.

In a preferred embodiment, described in greater detail below, the housing comprises a central cylindrical sleeve, cylindrical porting collars having proximal ends coaxially attached at opposite ends of the central sleeve, and cylindrical end caps coaxially attached to distal ends of each porting collar. The end caps include insulated retainers for positioning the electrode/dielectric subassembly within the interior of the housing. A described ozonizer system includes a plurality of such ozone generators mounted in an axially parallel arrangement and provided with a common coolant flow jacket.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DETAILED DESCRIPTION OF PREFERRED EMBODIMENTS

Figure 1:
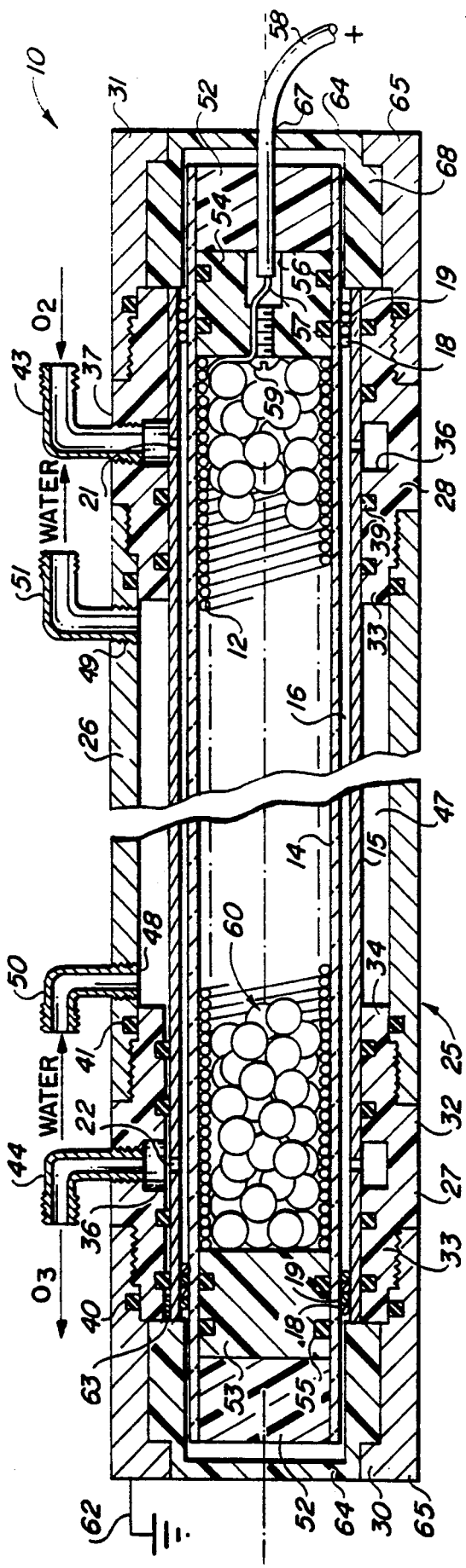
FIG. 1 is a longitudinal section view of an ozone generator in accordance with the invention.

As shown in FIG. 1, an illustrative ozone generator 10, in accordance with the invention, comprises a first electrode in the form of a stainless steel wire helical spring 12 extending longitudinally coaxially within the interior of a dielectric element which takes the form of a hollow glass tube 14. Spring 12 is mounted within tube 14 so that, in its relaxed state, its outside diameter is in contact with the inside diameter of the tube 14. A second electrode in the form of a stainless steel tube 15 is coaxially disposed about glass tube 14, so that the steel tube inside diameter is spaced from the glass tube outside diameter across an annular gap 16. As shown, tube 14 has exposed left and right ends that respectively project leftward and rightward out from corresponding ends of tube 15. Sealing means, in the form of alternating Viton and Teflon material O-rings 18, 19, acts to seal the axial extremities of gap 16 to provide a sealed air flow conduit between tubes 14, 15. Ingress and egress is accommodated by input and output ports 21, 22 which may comprise radial bores or circumferential arcuate slots, equiangularly-spaced and passing through the cylindrical wall of tube 15 adjacent its ends and located inwardly of seals 18, 19.

The described concentric dielectric/electrode subassembly arrangement is protectively housed within the interior of a hollow cylindrical housing 25. Housing 25 includes a central tubular sleeve 26 maintained in spaced relationship concentrically of electrode tube 15 between axially-spaced coaxial porting collars 27, 28, covered respectively at left and right extremities by left and right end caps 30, 31. Porting collars 27, 28 are identical members having a stepped longitudinal cross-section, characterized by a central portion 32 of increased outside diameter disposed between axially-spaced opposite end portions 33, 34 of reduced outside diameter. The portions 33, 34 are externally threaded to match corresponding internal threading provided on facing adjacent surfaces of sleeve 26 and end caps 30, 31. Respective diameters and diameter reductions of elements 26, 27, 28, 30, 31 are chosen to provide the joined structure 25 with a uniform smooth, uninterrupted outside diameter.

Each porting collar 27, 28 includes a cylindrical inside surface having a centrally located, circular groove 36. A threaded bore 37 communicates groove 36 with the cylindrical outside surface at portion 32. Collars 27, 28 are dimensioned, configured and adapted relative to tube 15 and sleeve 26 so that, when tube 15 is received within the housing subassembly comprising the joined members 26, 27, 28, the outside diameter of tube 15 will be in contact with the inside diameters of collars 27, 28, with grooves 36 of collars 27, 28 located annularly about tube 15 in respective fluid communication with ports 21, 22. Pairs of Viton material O-rings 39 are located in circular recesses on either side of grooves 36 to provide sealing between the outside of electrode tube 15 and the inside of collars 27, 28. Similar sealing arrangements are made at 40, 41 respectively between collars 27, 28, sleeve 26 and end caps 30, 31. Externally threaded gas inlet and outlet elbow fittings 43, 44 are threaded into bores 37 to respectively deliver oxygen rich air to, and ozone rich air from, the sealed grooves 36, as indicated by the labeled arrows.

The sealed space between the outside of electrode 15 and the inside of sleeve 26 defines an annular conduit 47 through which water or other electrode cooling fluid can be passed. Ingress and egress for the conduit 47 is provided by inlet and outlet ports in the form of threaded radial bores 48, 49 which communicate axial extremes of conduit 47 with the exterior of housing 25. Fluid inlet and outlet elbow fittings 50, 51 are threaded into bores 48, 49 to facilitate the communication. Water is preferably flowed into fitting 50 and out from fitting 51 as indicated by the labeled arrows in FIG. 1, in counterflow to the previously described flow of air through the annular gap 16. Housing sleeve 26, thus, acts as a cooling jacket to carry heat generated by the corona discharge away from electrode 15 which itself acts as a heat sink.

The remainder of structure 10 functions to position and isolate the active elements, and to provide connections to a source of high frequency voltage and ground. Spring 12 is extended, longitudinally within glass tube 14 for an axial distance which substantially corresponds to the axial extent of gap 16 through which air is flowed. The vacancies left between the ends of spring 12 and the corresponding open ends of glass tube 14 are filled by elements, such as elastomeric cylindrical plugs 53, 54, which function to center and electrically isolate spring 12. Plugs 53, 54 may be accommodated with O-rings 55 to assure sealing, and augmented by a flowable substance, such as a silicon elastomer caulk 52, cured in place.

Plug 54 includes a stepped axial bore 56 having an enlarged diameter right end into which is inserted an exposed conductor 57 end of an electrical lead 58. Conductor 57 is passed through the rest of bore 56 and attached for establishing an electrical connection between spring 12 and an external source of high voltage. A screw 59 threaded into a reduced diameter left end of bore 56 serves to secure the conductor 57 in place. The hollow core of spring 12 is preferably filled with glass or similar dielectric dense material 60. This reduces the volume of air sealed within tube 14, so serves to extend the useful life of anode 12 by keeping it free from impurities. This life-extending feature can be further enhanced by evacuating the sealed cavity, or modifying the illustrated configuration to enable a dielectric fluid-like transformer oil, to be passed through it and through an external heat exchanger. Connection of the cathode electrode tube 15 to ground is accomplished through connection of the interconnected conductive housing elements 27, 30 to ground at 62. A piece of corrugated metal shim stock 63 or the like may be inserted between facing surfaces of collar 27 and cathode 15 to prevent sparking that might otherwise occur. The end caps 30, 31 may be of composite construction comprising mated insulative inner portions 64 and conductive outer portions 65. The members 27, 28, and outer portions 64 of members 30, 31 may be made of the same stainless steel or other metal material, to provide a uniform electrical potential connection to ground at 62. Inner portion 64 may be made of Norel or similar plastic material. Lead 58 is extended through a bore 67 formed centrally in cap 32, and each portion 64 is dimensioned and configured to encompass and isolate ends of tube 14 that project beyond sleeve 15.

Use of helical spring 12 as the anode has many advantages. One advantage is that a spring will expand and contract lineally, axially within dielectric tube 14, not radially, in response to changes in its thermal environment. Expansion due to heat from the corona discharge will, accordingly, assert itself in a direction to compress the elastomeric caulk 52 and end plugs 53, 54 which are resilient, rather than in an outward radial direction which may break the glass. The spring 12 can, however, be reduced in outside diameter when elongated mechanically, thereby facilitating its insertion into tube 14. Another advantage is illustrated with reference to FIG. 2.

Figure 2:
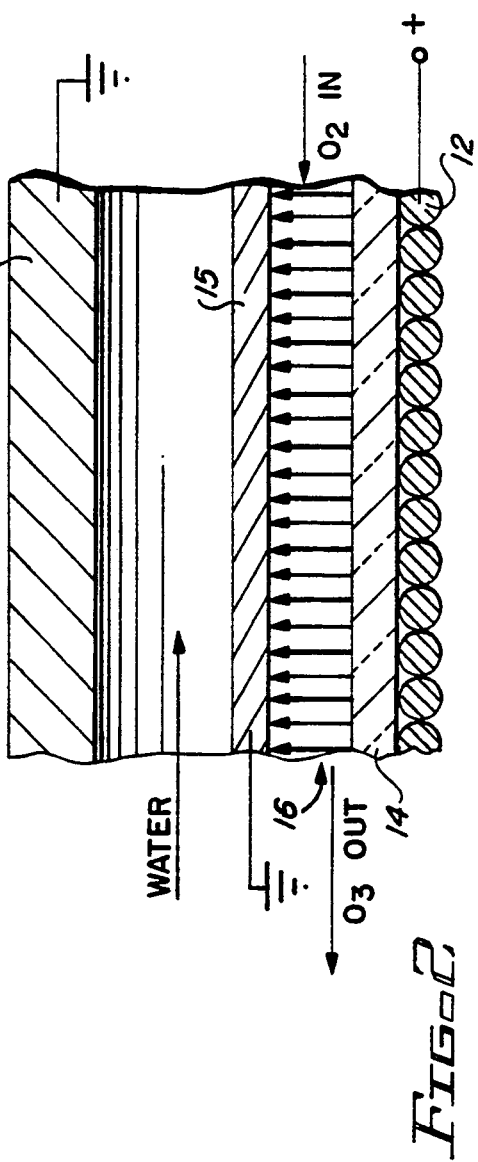
FIG. 2 is a schematic view helpful in understanding the operation of the generator of FIG. 1.

As shown in FIG. 2, oxygen-containing air passed through annular gap 16 between dielectric 14 and cathode 15 will be subjected to an electric field whose intensity varies sinusoidally repeatedly in the axial direction, from maximums occurring above the centers of the wires of the respective coils of spring 12 to minimums occurring above the interstitial gaps between the contacting coils. (The maximums are indicated by the darker upwardly-directed arrows. The minimums are indicated by the lighter upwardly-directed arrows.) Thus, oxygen molecules traveling axially along path 16 will experience a fluctuating field strength of high frequency, determined by the speed of the air stream and the center-to-center separation between the contacting series of coil turns. It is well known that increasing the frequency of the high voltage causing the corona discharge favorably affects the production of ozone. However, heretofore, inexpensive arrangements have been limited to 120 cps. or other frequencies of applied alternating current. The present arrangement enables the application of considerably higher frequencies, without the need to apply special voltage sources. The same effect is not inherent in prior art cathodes of the wire mesh, matrix grid type which present laterally as well as longitudinally varying electrode surfaces to the air current, thereby defining a totally random, or at least less well defined, field strength variation.

Figure 3:
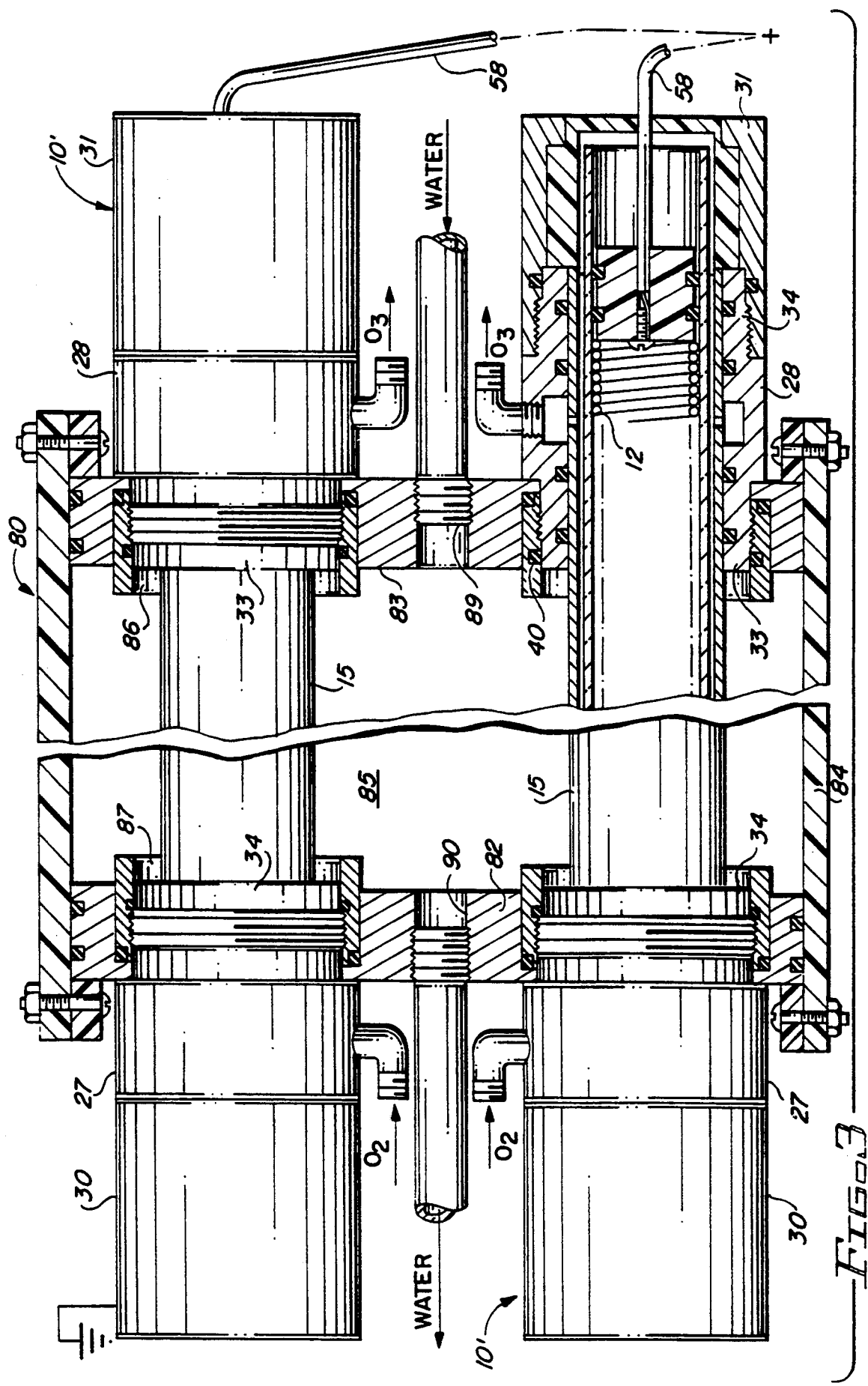
FIG. 3 is a similar section view of a system employing a plurality of ozone generators of the type shown in FIG. 1.

FIG. 3 illustrates an ozone generator system arrangement wherein a plurality of ozone generators 10' are mounted in axially parallel positions and provided with a common coolant flow jacket 80. The jacket 80 includes circular walls 82, 83, attached in axially spaced positions to close the ends of a cylindrical wall 84 to define a sealed chamber 85.

The generators 10' have the same general form as the generator 10 previously discussed, with only slight variation. The central tubular sleeve 26, described above, has been omitted, leaving the facing reduced outside diameter portions 33, 34 of porting collars 27, 28 exposed. These are, instead, threaded into correspondingly dimensioned, aligned bores 86, 87 of end walls 82, 83, to mount the generators 10' with their exposed tube electrode 15 sealed within chamber 85. Individual fittings 50, 51 and central sleeves 26 are omitted. Instead, water supply fittings 89, 90 are respectively connected through end walls 82, 83 of jacket 80 to provide water inlet and outlet ports communicated with the chamber 85 to establish a flow of water through chamber 85 for commonly cooling the separate cathodes 15, now exposed within that chamber. A common high voltage power source 98 may be electrically connected to the respective spring cathodes 12 through leads 58. Wall 82 may be of aluminum or other conductive material so that common connection between the separate cathodes 15 and ground may be established through an electrical link formed by the shim stocks 67 (FIG. 1), the collars 27, the wall 82 and the conductive outer portions 65 of one of the end caps 30. The cylindrical wall 84 of jacket 80 may be formed of suitable length of PVC tubing. The operation of the individual generators 10' is the same as the operation of the previously described generators 10.

The modular structure of ozone generators 10, 10' enables ready use of the same components in various length ozonizers. Other than using different length glass tube and electrodes, the only other adjustment required to change the length of generator 10 is to provide a different length central tubular sleeve 26. For the system shown in FIG. 2, the only other change is to extend the length of the cylindrical wall 84 portion of the common jacket 80.

Those skilled in the art to which the invention relates will appreciate that other substitutions and modifications can be made to the described embodiment without departing from the spirit and scope of the invention as described by the claims below.

What is claimed is:

1. In an ozone generator having a first tubular electrode; a second tubular electrode coaxial with and spaced from said first electrode; a tubular dielectric coaxially interposed between said first and second electrodes and spaced from said second electrode by a gap; means for flowing oxygen at a speed in an axial direction within said gap; and means connecting said first electrode to a source of high voltage and said second electrode to ground; the improvement comprising:
   one of said first and second electrodes being a conductive member defined by a series of axially-displaced contacting turns of wire, coaxial with each other and with said other of said electrodes, said member having respective wire centers and interstitial gaps between said centers spaced in said axial direction; said means connecting said first electrode to said source functioning to generate a corona discharge electric field whose intensity varies cyclically and repeatedly in said axial direction, from maximums occurring above said centers to minimums occurring above said interstitial gaps; and said means for flowing oxygen comprising means for flowing said oxygen in a path through said corona discharge so that said oxygen flow will experience a fluctuating field strength of frequency determined by said flow speed and the axial spacing of said centers.

2. An ozone generator comprising:
   a tubular dielectric element extending longitudinally in an axial direction, and having sealed left and right ends;
   a first electrode extending longitudinally coaxially within said sealed dielectric element;
   a tubular second electrode coaxially disposed about said dielectric element, and spaced from said dielectric element by an annular gap; said second electrode having a cylindrical wall with first and second openings therethrough;
   a cylindrical housing, having left and right end parts, and a central tubular part connected between said end parts, in spaced relationship coaxially of said second electrode to define an annular conduit;
   means connecting one of said first and second electrodes to a source of high voltage and the other of said first and second electrodes to ground for generation of a corona discharge within said gap;
   means for flowing oxygen through said first opening and into said gap to be acted on by said corona discharge for production of ozone;
   means for flowing said generated ozone out from said gap and through said second opening; and
   means for flowing cooling fluid through said conduit.

3. The ozone generator of claim 2, wherein said first electrode comprises a helical spring defined by a series of coil turns disposed in axially-displaced contacting positions, coaxial with each other and with said dielectric element.

4. The ozone generator of claim 3, wherein said dielectric element comprises a hollow glass tube having an inside diameter, and said helical spring has an outside diameter which, when said spring is in a relaxed state, is in contact with said glass tube inside diameter.

5. The ozone generator of claim 4, wherein said spring has a hollow core, and said generator further comprises a dielectric dense material filling said core.

6. The ozone generator of claim 2, wherein said dielectric element has left and right ends, and said left and right ends respectively project leftward and rightward beyond said second electrode; said housing left and right end parts comprise left and right end caps; and said left and right end caps include insulated portions dimensioned and configured to encompass and isolate said left and right ends.

7. The ozone generator of claim 2, wherein said left and right end parts include left and right porting collars; said porting collars include inside surfaces having circular grooves; said second electrode cylindrical wall openings respectively communicate opposite axial extremes of said gap with said grooves; and said means for flowing oxygen through said gap comprises means for flowing oxygen into said groove of one porting collar; and said means for flowing ozone out from said gap comprises means for flowing ozone out of said groove of said other porting collar.

8. The ozone generator of claim 7, wherein said porting collars are identical elements having increased outside diameter central portions disposed between axially-spaced reduced diameter opposite end portions; said central tubular part comprises a sleeve having opposite ends joined to proximal ones of said end portions; and said means for flowing cooling fluid through said conduit comprises means for communicating axial extremes of said conduit through said sleeve.

9. The ozone generator of claim 8, wherein said left and right end parts further comprise end caps respectively mated with distal ones of said end portions.

10. The ozone generator of claim 9, wherein said end caps have outside diameters; said sleeve has an outside diameter; and said end cap outside diameters, sleeve outside diameter, and central portion increased outside diameters are identical.

11. An ozone generator comprising:
   a hollow glass tube extending longitudinally in an axial direction, and having left and right ends;
   a helical spring electrode extending longitudinally coaxially within said hollow glass tube; said spring being defined by a series of coaxial coil turns disposed in axially-displaced contacting positions;

a tubular electrode coaxially disposed about said glass tube, and spaced from said glass tube by an annular gap, with said glass tube left and right ends respectively projecting leftward and rightward beyond said tubular electrode;

means sealing axial extremities of said gap;

input and output ports located inwardly of said gap sealing means and passing through said tubular electrode;

left and right end caps covering said left and right ends;

left and right porting collars covering said tubular electrode at said input and output ports, said porting collars having distal ends respectively joined to said left and right end caps, and proximal ends axially-spaced to leave a central portion of said tubular electrode exposed;

structure means, joining said proximal ends and defining a sealed space about said exposed central portion;

means connecting said spring electrode to a source of high voltage, and said tubular electrode to ground for generation of a corona discharge within said gap;

means for flowing oxygen into said input port to said gap, through said porting collar located over said input port, to be acted on by said corona discharge for production of ozone;

means for flowing ozone from said gap out of said output port, through said porting collar located over said output port; and means for flowing cooling fluid through said sealed space into contact with said exposed central portion for cooling said tubular electrode.

12. The improvement of claim 1, wherein said conductive member comprises a helical spring defined by a series of coil turns disposed in axially-displaced contacting positions.

13. The improvement of claim 12, wherein said tubular dielectric comprises a sealed hollow elongated glass tube having an inside diameter, and said helical spring has an outside diameter and extends longitudinally within said glass tube with said spring outside diameter in contact with said glass tube inside diameter.

* * * * *